(12) United States Patent
di Priolo et al.

(10) Patent No.: US 6,178,942 B1
(45) Date of Patent: Jan. 30, 2001

(54) PISTON CONFIGURATION FOR REDUCING SMOKE AND PARTICULATE EMISSIONS FROM DIRECT INJECTED ENGINES

(75) Inventors: Carlo Leto di Priolo, Milan (IT); Andrew A. Pouring, Edgewater, MD (US)

(73) Assignee: Sonex Research, Inc., Annapolis, MD (US)

( * ) Notice: Under 35 U.S.C. 154(b), the term of this patent shall be extended for 0 days.

(21) Appl. No.: 09/420,940

(22) Filed: Oct. 19, 1999

(51) Int. Cl.$^7$ ..................................................... F02B 19/00
(52) U.S. Cl. ............................ 123/273; 123/276; 123/279
(58) Field of Search ............................... 123/263, 193.6, 123/276, 279

(56) References Cited

U.S. PATENT DOCUMENTS

| | | |
|---|---|---|
| 4,898,135 | 2/1990 | Failla et al. . |
| 5,224,449 * | 7/1993 | Fukano et al. ...................... 123/279 |
| 5,322,042 | 6/1994 | de Priolo et al. . |
| 5,862,788 * | 1/1999 | Pouring et al. ...................... 123/276 |

* cited by examiner

*Primary Examiner*—John Kwon
(74) *Attorney, Agent, or Firm*—Bacon & Thomas, PLLC (57) ABSTRACT

A diesel cycle, direct injected internal combustion engine is provided with a piston recess or bowl into which fuel is injected each combustion cycle. One or more reaction chambers adjacent the piston recess are in communication with the recess through an array of discrete orifices located along the side wall of the recess. Partial reaction of fuel and air in the reaction chambers each combustion cycle produces radicals including intermediate species for seeding a fuel air mixture of a following combustion cycle through a delayed discharge of radicals from the reaction chamber into the piston recess. The discrete orifices are arranged in a specific array that ensures a desired chaotic flow in the reaction chambers and maximum interaction between radicals discharged from the reaction chamber and the soot cloud formed in the combustion chamber upon ignition of the fuel air mixture in the piston recess. Two or more rows of orifices may be used with at least one row located centrally along the reaction chamber cross-section and at least a second row intersecting the first row and arranged diagonally or vertically relative to the first row. The diagonal or vertical row includes orifices that intersect the reaction chamber tangentially at upper and lower regions thereof. The disclosed apparatus results in an exhaust effluent having markedly reduced smoke and particulate components.

21 Claims, 3 Drawing Sheets

PISTON CONFIGURATION FOR REDUCING SMOKE AND PARTICULATE EMISSIONS FROM DIRECT INJECTED ENGINES

BACKGROUND OF THE INVENTION

A. Field of the Invention

This invention relates to a piston configuration for a reciprocating piston, direct injected internal combustion engine.

B. Related Technology

Various combustion chamber configurations for direct injected, reciprocating piston internal combustion engines are described and utilized in the prior art. In particular, pistons including a central recess or bowl for receiving the major portion of each fuel and air charge of each combustion cycle and into which the fuel is injected by a fuel injector are commonly utilized in diesel cycle (compression-ignition) and Otto cycle (spark-ignited) engines.

It is well known that the exhaust stream of diesel cycle engines in particular may contain high levels of particulate matter (p.m.) (i.e., soot and soluble hydrocarbons) that are observable as dark smoke discharged from the engine exhaust, such smoke containing various solids or particulates as well as gaseous substances, all of which contribute to undesirable atmospheric pollution. Government regulatory bodies have enacted various laws and regulations reducing the permitted amount of smoke and particulate matter that may be contained in a diesel engine exhaust stream with the objective of improving the quality of atmospheric air, particularly in urban areas or other areas exposed to high concentrations of pollutants caused by engine exhaust emissions.

Reducing the discharge of p.m. from such engines has become a major objective of diesel engine manufacturers world wide and various attempts have been made to achieve more complete combustion of the relatively heavy, high cetane fuels typically combusted in diesel cycle engines. Much attention, for example, has been given to the manner in which the fuel is injected and atomized in the combustion chamber of the engine and other approaches to the problem of unburned hydrocarbons have been taken with various results.

A specific combustion chamber arrangement that has been found to reduce smoke and particulate emissions from diesel engines is described in U.S. Pat. Nos. 4,898,135 granted Feb. 6, 1990, and U.S. Pat. No. 5,322,042 granted Jun. 21, 1994, both of which are assigned to the assignee of the present invention. In accordance with the aforesaid patents, one or more small reaction chambers are located adjacent the piston recess and communicate with the recess through openings that may be configured as slots or discrete orifices. The orifices are configured to produce a lag between gaseous flow of fuel and air into the reaction chamber and the discharge of partially reacted fuel radicals and intermediate species from the reaction chamber into the piston recess area. This produces a delayed infusion or "seeding" of radicals (the term radicals is always intended to include intermediate species) into the piston recess to the extent that a supply of radicals is produced in the reaction chamber in a first combustion cycle and part of the radicals are discharged into the next succeeding pre-ignition fuel air mixture to promote desirable ignition characteristics in the mixture and more complete combustion of the fuel of the mixture.

In accordance with the prior art as described in the aforesaid patents, the various arrangements of orifices produced a high degree of interaction between the reaction chamber and the piston recess area each combustion cycle and further produced a reduction in smoke and particulate emissions discharged into the exhaust stream of the engine. However, in order to meet increasingly stringent emission standards for diesel engines, further improvements were needed to promote more complete combustion of the fuel injected into the engine combustion chamber.

BRIEF SUMMARY OF THE INVENTION

The present invention provides an improvement over the prior art described in U.S. Pat. Nos. 4,898,135 and 5,322,042 in the form of an improved arrangement of discrete orifices that provide communication between the reaction chambers described in the previous patents and the piston recess or bowl area where most and usually all of the fuel is injected during each combustion cycle of the engine. In accordance with the present invention, the orifices are arranged in an array so as to provide at least a first row of aligned orifices extending along the central cross-sectional area of the respective reaction chamber with which they are associated and at least a second row of aligned orifices extending diagonally or vertically along the reaction chamber cross-sectional area, with the first and second aperture rows intersecting each other.

At least some of the orifices of the second or diagonal row are located for tangential communication with the curvilinear cross-section of the respective reaction chamber.

The manner of locating the orifices in the reaction chambers is where the present invention introduces the breaking of symmetry into the design process. Use of concepts from chaos theory for locating orifices allows a greater degree of control of reactions than previously possible for the partial oxidation process within the reaction chamber and greater control of timing of the issuing of the jets communicating with the piston recess. The net result is an appreciable improvement in soot reduction enabled by the jet interaction with the soot cloud formed in each fuel injection plume, as will be discussed below.

The emergence of the concept of "space" (where location or distance has significance) in which location or distance could not previously be perceived in an intrinsic manner is called "symmetry breaking". One of the properties of such a system is the transition from simple random molecular behavior (where, within a simple system, the random behavior is the same with no opportunity to determine direction or location from the events taking place in the system) to a system with order and coherence (i.e., when a location can be determined due to fixed patterns of molecular behavior).

The advantage of symmetry breaking is that systems possessing this capability show perfect reproducibility, therefore stability in time for a repetitive process. Also of importance is that a region or system characterized by symmetry breaking is defined as a *Dissipative Structure*, which helps in characterizing the system under consideration. When dealing with dissipative structures we refer to the physics of far-from-equilibrium and self-organizational systems where under appropriate thermodynamic conditions a multitude of phenomena on a macroscopic scale can occur in the form of spatial patterns or temporal rhythms.

A combustion process using the distribution of reaction chambers interacting with the piston recess via the jet fluxes emanating from them is just one of many examples where thermal convection currents can drive chemical reactions to new auto-catalytic levels able to reduce soot and control NO formation well beyond levels previously attained.

The partial oxidization process in the relatively small piston reaction-chamber volume, where the volume of a reaction chamber in a single piston in a combustion chamber in which fuel is injected by a fuel injector having multiple orifices is given by:

$$k\ (V_{tdc})/\text{number of injector orifices}$$

where k is a number between 0.02 and 0.05 and $V_{tdc}$ is the total top dead center volume of the main combustion chamber and ranges from 0.3 to 0.9 cc, depending on engine size, is relatively easy to control compared to the actual combustion process in a large open combustion bowl or piston recess. The combustion bowl volume is typically at least 150 times the volume of the volume of a single reaction chamber. In the combustion bowl the elements related to control of combustion are relatively coarse or crude, for example, swirl, squish, compression ratio, injection pressure, number of injectors, injector location and use of Exhaust Gas Recirculation (ERG).

In the reaction chambers the elements allowing control of the speed of the partial oxidation process are volume, shape, material, as well as orifice size, location, number, and orifice length all of which also affect filling/emptying time. The mixture concentration within a given reaction chamber can be controlled by its location relative to the fuel injection plume both circumferentially with respect to any swirl and axially (with respect to bore). Of course, the time and rate of fuel injection are very important in determining the ultimate mixture composition within the reaction chamber. The chamber temperature can be controlled by these same parameters as well as by reaction chamber material. Thus, the traditional physical chemical rate controlling parameters of reaction vessel size, material, temperature and mixture composition are relatively controllable in small reaction chambers, while in the larger, open combustion bowl there is far less opportunity for control.

Many of the parameters that affect reaction rate also affect the time for filling a reaction chamber and for emptying it. During the emptying process, high speed jets form a highly reactive flux issuing from the reaction chamber which interact with the burning fuel plume. These jets create high turbulence which greatly reduce the soot formed by diffusive burning of the fuel droplets. The gas composition of these jets has also been shown to be important. It has also been shown that the gas jet most effective in reducing soot is carbon monoxide. (See Nakahira et al., SAE 920469 (1992))

Deterministic detailed kinetic calculations for a methanol reaction in a reaction chamber show that CO is the gas in greatest concentration within a reaction chamber (See Lu, Pouring and Keating. SAE 940758(1994)). Applicants have theorized that when the work of the aforesaid Lu et al. is extended to higher carbon fuels, besides the presence of stable radical ($HO_2$) and intermediate ($H_2O_2$) species in frozen equilibrium, those calculations too will show that CO is in the highest concentration. More exact information will someday be available in a temporal manner when calculations using a time dependent nonequilibrium approach can be performed for a dissipative structure.

In U.S. Pat. No. 5,862,788 the importance of designing reaction chambers with a Design Index 1,5<I<10 for good soot reduction at low NOx operation was explained. Chambers with horizontal orifices were located for maximum jet interaction within the soot cloud formed by the burning injection plume. This design together with the use of EGR gave the lowest soot (~0.07 g/kWh) observed to date at low NOx levels (~2.5 g/kWh) following a 13 Mode emissions cycle in a modern normally aspirated diesel engine.

What Applicants have discovered recently and confirmed by repeated experiments is that by following the principles discussed by Prigogine in his book "Exploring Complexity" (W. H. Freeman & Co., N.Y., 1989) in the design of a reaction chamber, the soot can be lowered substantially below that obtainable using concepts as disclosed in U.S. Pat. Nos. 5,862,788; 5,322,042 and 4,898,135, all assigned to the assignee of this application.

The prior art taught the use of a tangential orifices to create a high velocity vortex within the reaction chamber as well as taught the placing of a central orifice(s) located such that the issuing jets created the maximum turbulence directly in the burning plume soot cloud.

Figure 5:
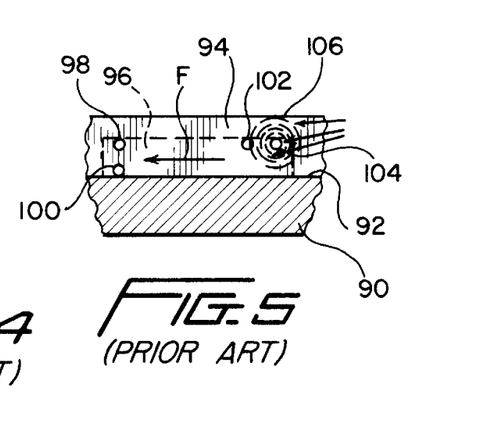

Referring to FIG. 5, if more than one discrete (tangential) orifice 98 were used along the upper surface of reaction chamber 96, as disclosed in U.S. Pat. No. 5,322,042, the internal flow within the chamber 96 during the filling process would have "symmetry" in the sense of Prigogine's theory. That is, there is no distinguishable measure of distance between a series of orifices such as 98. An observer (such as the "Maxwell Demon" described in the scientific papers of James Clerk Maxwell, Cambridge University Press (1890) could not distinguish whether he was between orifice #1 and #2 or between orifice #2 and 3.

Following the teachings of U.S. Pat. No. 5,862,788, a different "symmetry" would be realized if a series of discrete orifices 64 were located along the centerline of reactive chamber 68 of FIG. 2. Here too, there is no distinguishing parameter or means of identification of location to an observer between orifice #1 and #2 or between orifice #2 and #3.

Figures 1, 2, 3:
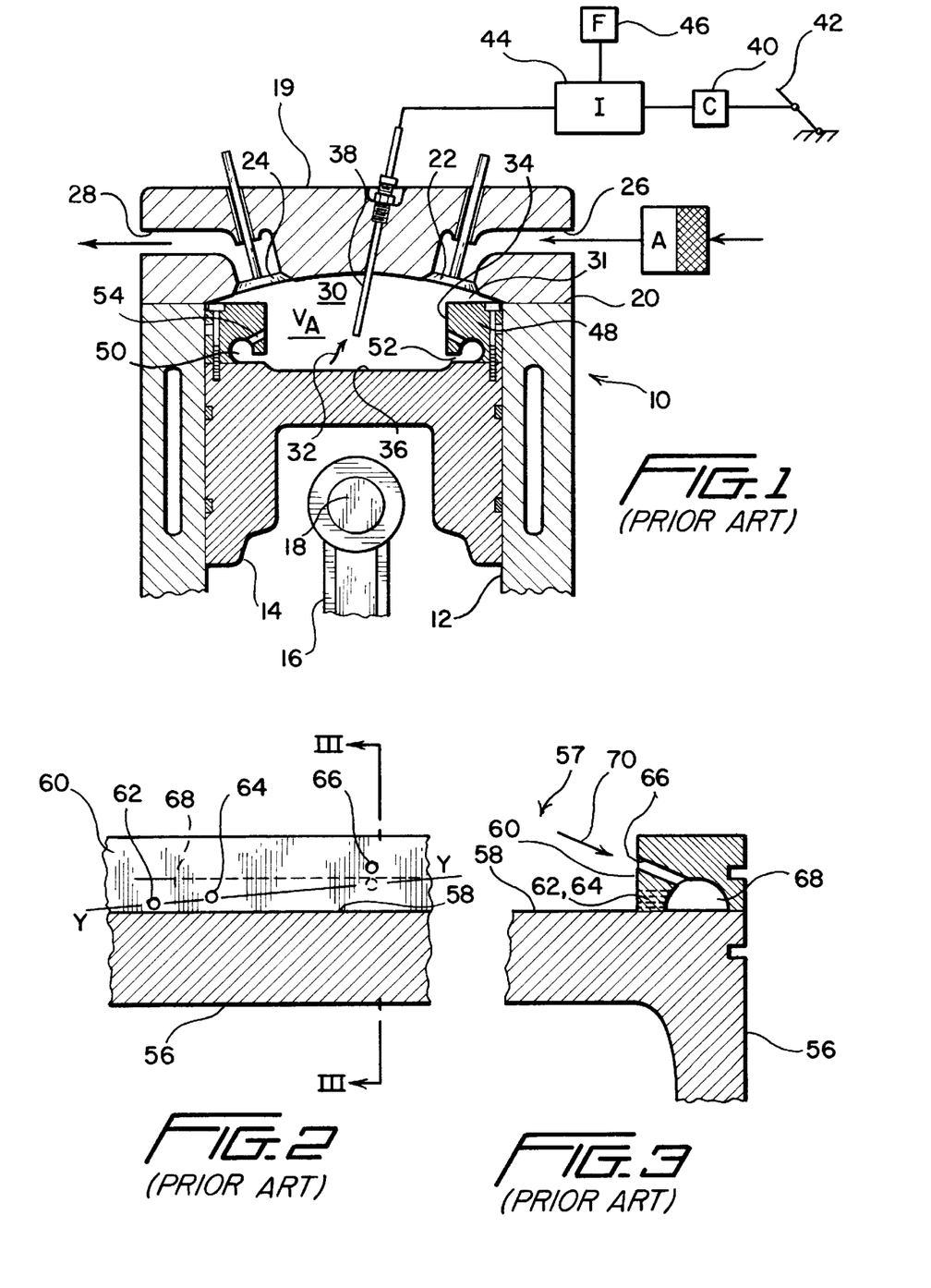

In FIG. 2, a stagnation point where the flow velocity is zero would be found on the reaction chamber wall opposite the orifice opening. In FIG. 5 (Prior Art), no such stagnation point would be found opposite discrete orifice 98 since a vortex with finite velocity is formed due to the tangential orifice entrance to the reaction chamber.

What Applicants have discovered, in accordance with the principles of Prigogine on destruction of symmetry, is that by modifying the structures of both U.S. Pat. Nos. 5,862,788 and 5,322,042 in a unique manner as described hereinbelow, is broken not only in the flow field, giving more intense mixing in the reaction chamber, but also in the general class of chemical reactions taking place within the reaction chamber. An observer within the reaction chamber could measure distance from an end wall and know by the different swirl directions of tangential vortices as depicted, for example, in FIGS. 9b and 9c, whether he was located between orifice 116 and 122 or orifice 118 and 124, FIG. 8.

Figure 9A:
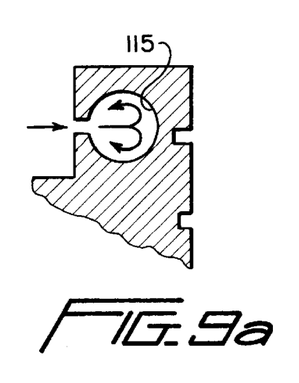
FIGS. 9a–9c show flow patterns of incoming air and fuel admitted to a reaction chamber through the orifices shown in FIGS. 6a, 6b, 7 and 8.
Figure 9B:
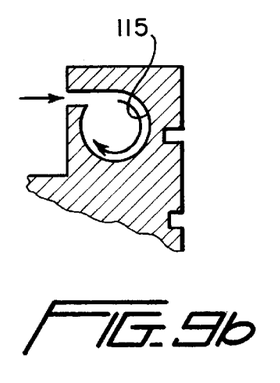
Figure 9C:
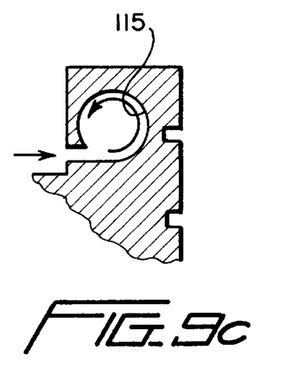

In the geometry of FIG. 9b or FIG. 9c, because of the intimate contact of vortex formed by orifice 122 or orifice 124 within the reaction chamber, rates of surface heat transfer are very high, changing the mean temperature of the vortex flow. At the same time, the intimate contact of the flow with the reaction chamber surface favors heterogenous (surface) gas phase reactions of the mixture.

It is known that partial oxidation of fuel within the reaction chamber, through the cool flame regime once the fuel is injected into the cavity, will occur. This provides a reservoir or pool of highly reactive chemical species for later discharge through the orifices connecting the reaction chamber to the combustion bowl. It is also known that key radical and intermediate species, defined to be necessary for autoignition, persist in time due to quenching to frozen equilibrium by the expansion process occurring after the piston reaches top dead center (TDC). Thus, these frozen equilibrium and other species issue in the high speed flows from the orifices when a pressure imbalance occurs ($P_{rc}>P_{bowl}$) (rc=reaction chamber) and react with the soot cloud formed in the combustion chamber.

In the geometry of combustion chamber described in U.S. Pat. No. 5,862,788 because of the free expansion into the reaction chamber, generally in the centerpiane of the reaction chamber, and farthest from the adjacent walls, the class of chemical reactions tends to be homogeneous gas phase reactions while the flow is between the orifice entrance of the reaction chambers and the stagnation point on the far wall.

Thus, having orifices entering the reaction chamber at the two extremes as disclosed in U.S. Pat. Nos. 5,862,788 and 5,322,042 gives the greatest latitude in the type of reactions that can occur in the reaction chamber, that is, those governed by heterogenous (surface) gas phase reactions and those by homogenous reactions away from surfaces. These two extremes allow the greatest probability that partial oxidization reactions occurring within the reaction chamber are governed by heterogeneous reactions in one region and by homogeneous reaction in another with their different inherent reaction rates. Since there are alternating regions involved, it is also more probable by this alternating geometric arrangement, that standing chemical waves can occur or that oscillations in the form of a chemical clock can occur within the reaction chamber.

The net result of breaking the symmetry of a reaction chamber of the type disclosed in U.S. Pat. No. 5,862,788 (orifices 116,118,120, FIG. 6b) by adding orifices (122,124, 122a, 122b, etc.) discussed herein, is a near doubling of the soot reduction capabilities of the prior art system.

One can view the piston recess plus reaction chamber as a special system where small changes in the reaction chamber are amplified in the piston recess due to the interaction of the high speed reactive jets communicating between the piston recess and reaction chamber. An amplifier, in general, is recognized as a device possessing a small control subsystem that will cause large changes is another system, or a device whose output is a function of an input signal and which relies on energy from a source other than the input signal. In addition, the gain of an amplifier is defined as the ratio of the output to the input signal. One can therefore consider the reaction chamber and combustion chamber as an amplifier of combustion process efficiency whose gain (in soot reduction) is controlled by reaction chamber design wherein the input or control signal is generated. A reaction chamber designed according to the teachings of the prior art would have a gain of X, while a reaction chamber designed according to the symmetry breaking concepts disclosed herein would have a gain of nearly 2X.

The following definition of "Process Amplifier" applicable to the inventive combustion chamber can be used: "The extension of the space/time available for the combustion process to convert energy available into useful mechanical work with minimal harmful exhaust emissions". In direct injected diesel engines, the amount of soot reduction, i.e., gain, can therefore be controlled by reaction chamber design.

The array of orifices is arranged to interact in an optimum manner with the soot cloud or fuel ignition plume that occurs each combustion cycle immediately following ignition of the air and fuel mixture in the combustion chamber. Because the air and fuel mixture in the piston recess typically is swirling at a high velocity circumferentially around the piston recess, the array of orifices arranged in accordance with the invention ensures that the discharge of radicals from the microchamber or chambers is directed towards the central portion of each soot cloud as it is formed and as it moves with the swirling and burning fuel and air mixture.

BRIEF DESCRIPTION OF THE DRAWINGS

FIG. 1 is a schematic vertical cross-sectional view of a combustion chamber of a piston-type, direct injected compression-ignited internal combustion engine showing a prior art arrangement including a piston and a reaction chamber in the piston crown area with a continuous slot opening between the piston recess and the reaction chamber;

FIGS. 2 and 3 show various discrete orifice arrangements providing communication between a reaction chamber and the piston recess of a combustion chamber similar to that shown in FIG. 1 and wherein FIG. 3 is a view taken along line III—III of FIG. 2;

FIGS. 6a, 6b, 6c, 6d, 7 and 8, show exemplary preferred embodiments of an array of discrete orifices located in accordance with the invention for providing communication between the piston recess and a reaction chamber and wherein

DETAILED DESCRIPTION OF PREFERRED EMBODIMENTS OF THE INVENTION

With reference to FIG. 1, a prior art combustion chamber of a piston-type, direct-injected, compression-ignited (diesel) internal combustion engine is illustrated and comprises an axially extending cylinder 12 having a closed upper end and within which axially reciprocates a piston 14 connected to a connecting rod 16 by a crank pin 18 for transmitting motion to an engine crank shaft (not shown) located towards the lower part of the engine as seen in FIG. 1. The cylinder 1 2 is closed at its upper end by a cylinder head 19 joined to the engine block containing the cylinder 1 2 along a connecting area 20.

The cylinder head 19 includes appropriate intake and exhaust valves 22, 24, respectively, wherein the intake valve 22 admits air through the intake port 26 into the combustion chamber 30 during the intake portion of a combustion cycle carried out in the combustion chamber and exhaust valve 24 discharges combustion products from the combustion chamber 30 outwardly through an exhaust port 28 in the engine head 19.

The combustion chamber 30 is located between the top or crown area of the piston 14, such crown area terminating at upper surface 31 of the piston 14, and the head 19.

A recess 32 defined by a sidewall 34 and bottom wall 36 is provided in the crown area of the piston and a fuel injector 38 is arranged to directly inject fuel into the recess 32 under control of a fuel injector controller 40 that responds to a speed control 42 for regulating the fuel injector pump 44 that receives fuel from a fuel supply 46.

The recess 32 may be formed on the piston crown by a separate bolt-on crown element 48 or by any other means known in the art. For example, laser welding techniques, integrally cast forms, machines elements and the like may be utilized to form a recess 32 in the crown area of the piston 14.

Adjacent the periphery of the recess 32, one or more reaction chambers 50 are provided which are in communication with the recess 32 via a continuous slot 52 and orifices 54.

In accordance with this structural arrangement, a fuel and air mixture admitted into the combustion chamber 32 via intake port 26 and fuel injector 38 (in the case of a direct injected engine) is compressed as the piston moves to its minimum volume position (top dead center or TDC). During the compression portion of the combustion cycle, fuel and air are admitted into the reaction chamber 50 via the slot 52 and orifices 54 and undergo partial reaction oxidation in the reaction chamber to produce various fuel radicals (the term "radicals" includes intermediate species as well) which are held in the reaction chamber for use in a subsequent combustion cycle.

Each slot 52 and orifice 54 is configured to quench any flame front approaching the reaction chamber 50 and may in some configurations but not necessarily choke or partially choke inward and/or outward flow of compressed gases between the recess 32 and the combustion chamber 50 above predetermined engine operating speeds, typically speeds above minimum lower speeds. It will be understood that the crown portion of the piston will be at an elevated temperature after the initial few combustion cycles and the reaction chamber 50 is configured and located so as to take advantage of the elevated temperature of the crown area of the piston.

For a fuller understanding of the structure and function of the prior art example illustrated in FIG. 1, reference may be had to U.S. Pat. No. 4,895,135 granted Feb. 6, 1995, and which is owned by the assignee of the present invention. U.S. Pat. No. 4,898,135 is incorporated herein by reference.

Another prior art example of a combustion chamber arranged to take advantage of radical seeding a fuel and air charge in a combustion chamber is seen in FIGS. 2–5, where a piston 56 is provided with a crown area defined by a bottom wall 58 and sidewalls 60. Discrete orifices 62, 64, 66 provide communication between a reaction chamber 60 provided in the crown area of piston 56 and the adjacent recess 57.

In accordance with this example, the discrete orifices 62, 64 and 66 are provided instead of a continuous slot because of the benefits observed when discrete orifices are used instead of a continuous slot. Moreover, the discrete orifices are arranged in accordance with the examples of FIGS. 2 and 3 so that injected fuel impingement as shown by arrow 70 in FIG. 3 is aligned with the discrete orifice 66 which is intended to receive fuel from a fuel injector (not shown) that directly injects fuel into the recess 57.

In accordance with the embodiments of FIGS. 2 and 3, orifices 62 and 64 would be arranged to receive primarily air during each combustion cycle, taking into account that the fuel spray from a fuel injector could be directed towards orifice 66 while the orifices 62 and 64 receive and control admission of air during the compression portion of the combustion cycle.

In accordance with the prior art embodiment illustrated in FIGS. 2 and 3, the orifices 62, 64 and 66 could be diagonally aligned along an axis Y—Y diagonally intersecting the cross-section of reaction chamber 68.

In some instances, it may be desirable to omit one or more of the air control orifices 62, 64 and because the air and fuel in the recess 57 typically are moving in a rotary swirling pattern, the locations of the orifices may be configured to take into account the swirling motion of the air and injected fuel. For example, in FIG. 2 the swirling motion typically would travel from left to right so that fuel injected toward orifice 66 would leave orifices 62 and/or 64 relatively free of fuel, taking into account that the swirling motion of the mixture would sweep the fuel away from the orifices 62 and 64 after impingement with the area of orifice 66. However, the swirling motion also could be in the opposite direction as well.

Figure 4:
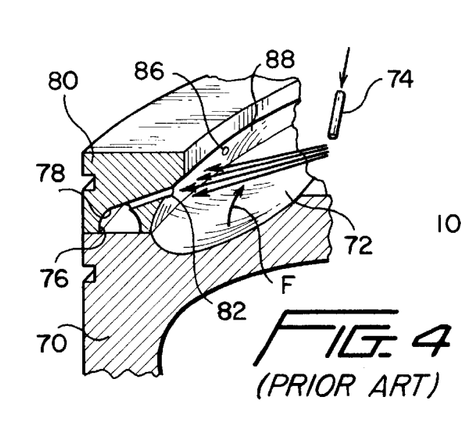
FIGS. 4 and 5 show discrete orifice arrangements where fuel is directed during injection so that it intersects an orifice intended to receive injected fuel.

In accordance with the prior art example shown in FIG. 4, a piston 70 is provided with a recess 72 that is sloped in a radially outward direction so as to provide a pocket area for receiving fuel ejected from fuel injector 74. A reaction chamber 76 provided in the piston crown area adjacent the recess 72 includes a curvilinear upper wall 78, the recess being illustrated as contained within a piston crown element 80 within which the structure of the reaction chamber 76 and the wall 78 is provided.

A single discrete orifice 82 is utilized to primarily control the admission of fuel into the reaction chamber 76. To achieve this result, the orifice 76 is located in the center of the spray pattern of fuel emitted from injector 74. The orifice may be located slightly eccentric of the center of the spray pattern of the fuel to take into the account the swirling motion of the air and fuel mixture as indicated by arrow F. A separate, geometrically separated discrete orifice 86 may be provided in the sidewall 86 of the recess 72, such orifice 86 being arranged to receive primarily air to be admitted into the reaction chamber 76. In this embodiment, the orifice 86 for receiving and controlling air admission into the reaction chamber 76 is circumferentially separated from the orifice 82 and may be located at a higher or lower point relative to the reaction chamber 76 to achieve desired circulation of fluid in the reaction chamber 76.

In accordance with the prior art example illustrated in FIG. 5, a piston 90 includes a recess area defined by bottom wall 92 and sidewall 94 in the crown area of the piston 90, with a reaction chamber 96 located in the crown area of the piston adjacent the recess in a manner similar to the example shown in FIG. 4.

Communication between the reaction chamber 96 in this embodiment and the recess is provided by means of discrete orifices 98, 100, 102 and 104. In this arrangement, the fuel impingement zone is illustrated at 106 and is intended to direct fuel to orifice 104 that controls fuel admitted into the reaction chamber 96, while orifices 96, 100 control primarily air admission into the reaction chamber 96. If desired, an additional orifice 102 may be provided to assist in the control of fuel admission into the reaction chamber 96, particularly if the swirl direction of the air and fuel mixture is moving in the direction from right to left as shown in FIG. 5 as depicted by arrow F.

For a complete description of the prior art examples illustrated in FIGS. 4 and 5, reference may be had to U.S. Pat. No. 5,322,042 granted Jun. 21, 1994, assigned to the assignee of this application.

In accordance with both U.S. Pat. Nos. 4,898,135 and 5,322,042, the rate of generation of radicals within each reaction chamber, the rate of radical inflow into the chamber from the combustion chamber from a previous combustion cycle, and the flow of radicals retained in the reaction chamber each combustion cycle satisfy the formula:

$$R_{OUT}=R_{GEN.}+R_{IN}-R_{RET.}\geq R_{CRT.}$$

where:

$R_{OUT}$=radicals discharged from the reaction chamber into the piston recess;

$R_{GEN.}$=radicals generated during each combustion cycle in the reaction chamber;

$R_{IN}$=seeded radicals from the combustion chamber returned to the reaction chamber during compression of the seeded charge;

$R_{RET.}$=radicals retained in the reaction chamber each combustion cycle;

$R_{CRIT.}$=the minimum population of radical species in the reaction chamber required t consistently seed a charge in the combustion chamber during each combustion cycle so as to obtain a preselected ignition and combustion characteristic of the charge for a given engine.

Also as pointed out in the aforesaid patents, the overall objective of this combustion chamber arrangement is to seed and incoming fuel and air mixture or charge so that an effective concentration or population of radical species will be present in the combustion chamber, in particular in the recess of the combustion chamber, so that initiation of ignition of the fuel charge, including low cetane fuels at normal (i.e., 5 to 10 for example) compression ratios, will occur in a predictable, dependable manner. It is assumed that an appropriate physical environment for initiating ignition will exist in the combustion chamber by selection of an appropriate compression ratio, materials of construction and cooling systems in accordance with well known combustion chamber design parameters. The formula expressed above reflects that the production of radicals and the seeding of the incoming charge for each combustion cycle must be equal to or exceed an amount or rate that is sufficient to initiate combustion in the main combustion chamber consistently and reliably and/or to enable knock-free combustion of gasoline fuels in a spark ignited engine. The absolute amount of radical production in the reaction chambers will vary with each engine depending on the fuel type, compression ratio, engine operating conditions and other variables associated with the operation of each engine. It can always be determined experimentally, however, utilizing the principles described herein, what the critical rate ($R_{CRIT.}$) of production of radicals in the reaction chamber must be to achieve adequate conditioning (i.e., seeding) of the charge in the combustion chamber to obtain such consistent and reliable spontaneous ignition and smoke free combustion in compression ignition engines or knock free combustion in spark-ignited engines.

From the formula, it will be observed that the quantity of radicals generated within the reaction chamber plus the quantity of radicals remaining from the prior combustion cycle that may be readmitted into the chamber during a current combustion cycle, less the quantity of radicals retained within the chamber during the current combustion cycle, must equal or exceed that critical quantity of radicals that will be available in the reaction chamber for discharge through discrete orifices into the recess in the crown area of the piston.

The discharge of radicals, as noted previously, occurs during normal engine operating speeds beginning during the expansion portion of the combustion cycle when the pressure in the combustion chamber of the engine drops below the pressure in the reaction chamber. The discharge of radicals continues through the exhaust event of the combustion cycle until the beginning of the intake portion of the next cycle because effectively a time lag exists between the pressure fluctuations within the combustion chamber and the reaction chamber of each engine. This ensures that the discharge of radicals from each reaction chamber will continue beyond the expansion and exhaust portions of the current combustion cycle and continue into the intake portion of the next combustion cycle. This further ensures a supply of a sufficient quantity of radicals into the combustion chamber to obtain the desired ignition and combustion characteristics of the charge undergoing compression in any given engine. Under some conditions for some engines, a choked flow condition may occur through the orifices during either or both compression and exhaust events in the combustion chamber.

In the reaction chamber, a pre-flame or cool flame reaction produces pre-combustion radicals and intermediates that are important for seeding an incoming charge and to provide desirable reliable ignition characteristics of the charge.

In any practical embodiment of the invention, as expressed in U.S. Pat. No. 5,322,042, it is has been discovered that certain desired parameters are important for establishing a relationship between the reaction chamber volume, the combustion chamber volume and the total orifice area of the discrete orifices. As described in U.S. Pat. No. 5,322,042, the following relationships were observed for establishing a "Design Index" or "I" that provides a design objective for any reciprocating piston engine to obtain an initial total orifice area for the discrete orifices associated with a piston recess and a reaction chamber to be incorporated in a piston for the engine.

This Design Index in accordance with the prior art was expressed as the formula:

$$I=X/Y=16 \text{ to } 26$$

where:

$$X=V_C/A_P$$

and:

$$Y=V_{TDC}/V_{CT}$$

and where:

I=Design Index;
$V_C$ individual reaction chamber volume;
$A_P$=total orifice area of all discrete orifices communicating with an individual reaction chamber;
$V_{TDC}$=total top dead center combustion chamber volume; and
$V_{CT}$=total reaction chamber volume(s).

The value of a Design Index "I" was determined experimentally in accordance with the prior art by measuring the performance of various engine configurations using a variety of combinations of combustion chambers, orifices and reaction chambers to determine which combinations produce the best engine performance. Through experimentation, it was determined that the Design Index "I" (a quasi non-dimensional numeral) should lie between approximately 16 and 26 for any given engine. With this value of "I" as a starting point, the volumes of the reaction chamber or chambers were initially designed for any given engine and the total orifice area of all discrete orifices was determined. The total orifice area could then be divided by the desired number of discrete orifices for controlling admission of fuel and air to a reaction chamber.

Depending upon the size and orientation of the reaction chamber or chambers, initially one might begin by dividing the total orifice area in two and providing one fuel control orifice and one air control orifice. However, more typically, several fuel control orifices are provided and several air control orifices can be provided at separate locations spaced along the length of the reaction chamber.

The location of the orifices will be fine tuned to ensure maximum "run quality index" (RQI) for any given engine. For a fuller description of RQI, reference may be made to U.S. Pat. No. 5,322,042 and U.S. Pat. No. 4,592,318 owned by the assignee of this invention.

It has been recognized in accordance with the prior art that it is desirable to create a chaotic flow condition within each reaction chamber to provide optimum control over the generation of fuel radical species and over the discharge of the radical species into the main combustion chamber during succeeding combustion cycles. However, in any given engine, the precise locations of the discrete orifices may be varied in accordance with specific engine combustion chamber configurations, engine operating conditions, specific combustion cycle used, as well as other factors or variables.

While the various reaction chamber and orifice arrangements described in the prior art have been observed to improve ignition and combustion characteristics of heavier, high cetane fuels in direct injected lower compression ratio diesel cycle engines, it was further observed that the generation of smoke and particulates discharged through the engine exhaust stream were markedly reduced using the reaction chamber and orifice arrangements thus far described. The reduction of such emissions from diesel cycle engines has become an important objective for diesel engine designers in view of increased constraints on such emissions imposed by government authorities wishing to reduce general atmospheric pollution levels.

Further experimentation was carried out to optimize the reduction of smoke and particulate emissions from diesel cycle engines and it was observed that a specific arrangement of discrete orifices arranged to interact with the soot cloud or ignition plume that is formed in the recess of the piston during each combustion event resulted in still further reduction in the emission of smoke and particulate matter in engine exhaust streams. U.S. Pat. No. 5,862,788 granted Jan. 26, 1999, and assigned to the assignee of the present invention describes such an arrangement.

In accordance with the present invention, with reference to FIGS. 6a, 6b, 7 and 8, an exemplary piston 110 includes a recess defined by a bottom wall 112 and an axially extending sidewall 114. A reaction chamber 115 having a curvilinear sidewall is provided in the piston crown area adjacent the recess and an array of discrete orifices 116, 118, and 120, 122 and 124 is provided and wherein orifices 116, 118 and 120 are aligned circumferentially along the side wall 14 substantially parallel to bottom wall 112 and approximately in alignment with the longitudinal or circumferential central cross sectional area of the reaction chamber 115.

Orifices 118, 122 and 124, on the other hand, are diagonally arranged with respect to the direction of alignment of orifices 116, 118 and 120, with end orifices 122, 124 preferably intersecting the reaction chamber 115 tangentially at its upper and lower regions, respectively. The two rows of apertures preferably intersect each other at common aperture 118.

In a manner similar to the prior art as depicted in FIG. 5, one of the orifices 116, 118, 120, 122 and 124 will be located so as to control admission of primarily fuel into the reaction chamber 115 and one of the orifices will be located so as to control admission of primarily air into the reaction chamber. In the embodiments illustrated in FIG. 6b, the leftmost orifice 116 constituting the most upstream orifice of the array 116, 118, 120, 122 and 124 relative to the swirl flow motion F that occurs in the piston recess during the compression stroke would be located so as to control admission of primarily fuel into the reaction chamber 115 in a manner similar to that described in connection with FIG. 5. Orifice 120 located at the opposite end of the reaction chamber and at the most downstream location relative to the swirl motion F with respect to the reaction chamber 115 would be located to control admission of primarily air into the reaction chamber.

Figures 6A, 6B:
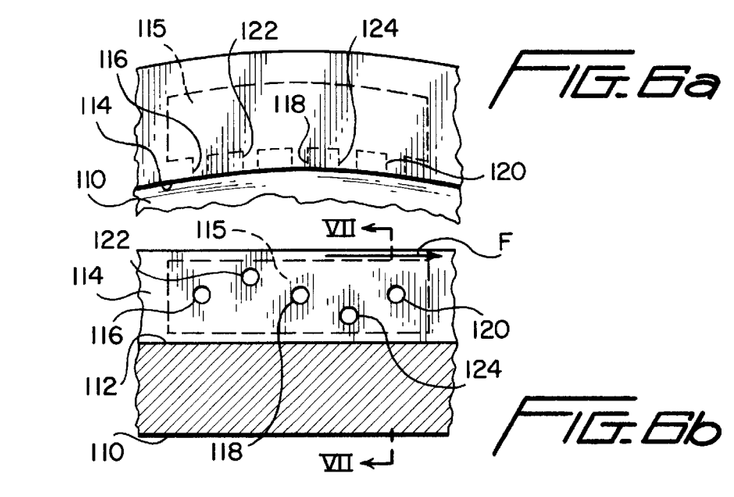
Figure 6C:
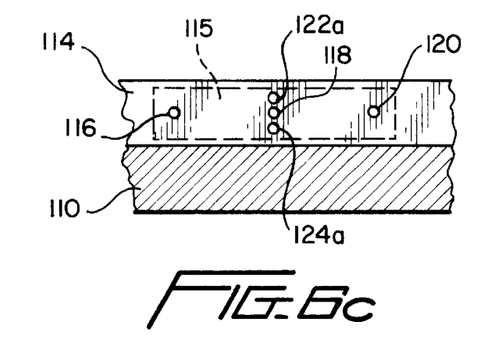
Figure 6D:
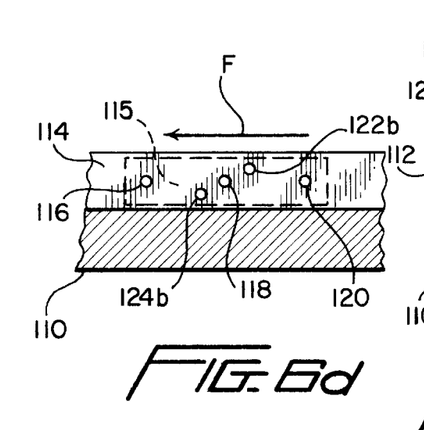

In the embodiment shown in FIG. 6d, given that the swirl motion F is in the opposite direction, orifice 120 would be located to control admission of primarily fuel into the reaction chamber 115, while orifice 116 would be located so as to direct admission of primarily air into the reaction chamber. The other orifices of the array would receive and control admission of various charge constituents into the reaction chamber.

In the embodiment shown in FIG. 6c, the fuel control orifice and air control orifice could be designated as either orifice 116 or orifice 120, depending on the direction of swirl motion, provided that the orifice located upstream relative to the swirl motion is located to admit primarily fuel into the reaction chamber while the orifice located at the opposite end of the reaction chamber is located to control admission of primarily air into the reaction chamber.

Figure 8:
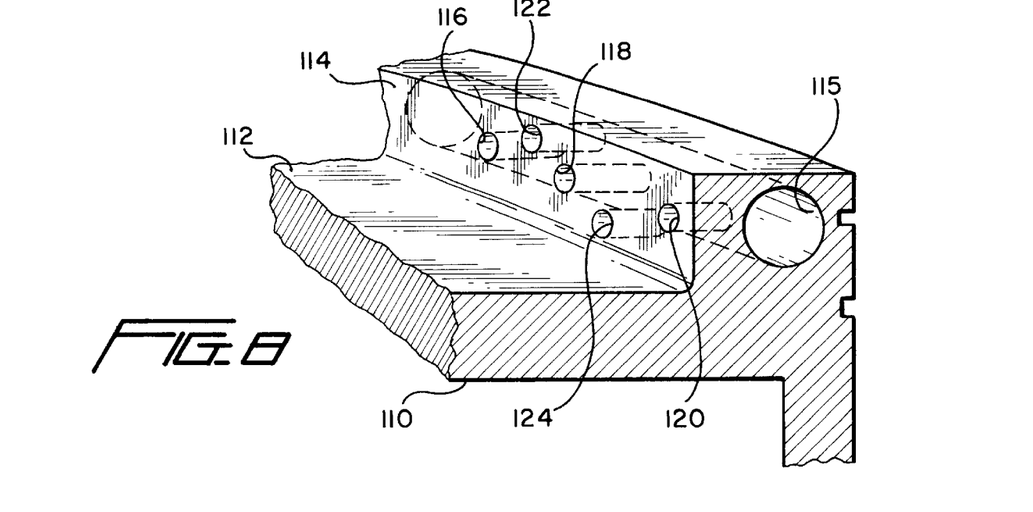

The orifice array illustrated in FIG. 6b is illustrated in FIG. 8 in an enlarged perspective. With the array of orifices intersecting the reaction chamber 115 in the manner illustrated, flow patterns of incoming air and fuel are generated in the reaction chamber in the manner schematically illustrated in FIGS. 9a, 9b and 9c. Orifices 116, 118 and 120 would provide a flow arrangement somewhat similar to that illustrated in FIG. 9a wherein the incoming flow is discharged centrally in the reaction chamber 115; orifices 122 and 123, on the other hand, would generate flow patterns generally similar to that illustrated in FIGS. 9b and 9c, respectively. Considering all flows in combination, it will be appreciated that a chaotic, intensively mixed circulation condition is obtained within the reaction chamber 115 to promote partial oxidation and generation of radical and intermediate species to a maximum extent.

Outflow from the reaction chamber 115 into the recess area above the bottom wall 112 occurs in a unique pattern that is an important aspect of the present invention. As noted previously during the discussion of the prior art, in particular U.S. Pat. No. 5,862,788, aligned rows of fuel and air orifices extending parallel to the bottom wall of the recess as shown in FIG. 5 have been observed to interact well with the soot cloud produced during each ignition of charge in the combustion chamber during certain engine operating speeds, while an inclined row of orifices such as illustrated in FIG. 2 was observed to reduce smoke and particulate emissions during different engine operating speeds. Further improvements in reducing smoke and particulate emissions from diesel cycle engines were desired, however.

Figure 10:
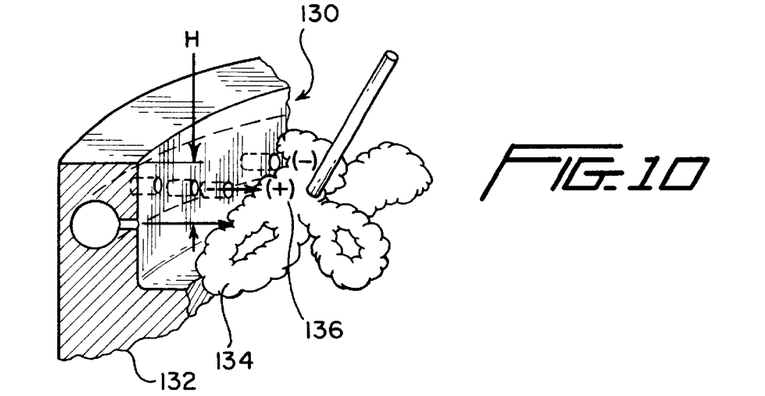
FIG. 10 show the relationship between an array of orifices as shown in FIGS. 6a, 6b, 7 and 8 and a swirling soot cloud formed in a combustion chamber upon initiation of combustion.

FIG. 10 illustrates a typical recess area 130 of a piston 132 in which a soot cloud 134 having a central region 136 has been formed immediately following ignition of the fuel mixture. It has been determined experimentally that discharge of radicals in a direction that will cause the radicals to interact intensely with the central region 136 of the soot cloud is highly desirable and achieves reduction of smoke and particulate emissions in diesel cycle engines. Attempts were made to use a single discrete orifice located so as to discharge radicals from the reaction chamber of the piston towards the central area of the soot cloud but it will be appreciated that determining the precise location of the single orifice in a given engine requires considerable experimentation to ensure that the single orifice will always interact with each soot cloud formed in the piston recess of the combustion chamber. Given that a swirling flow of air and fuel, including the soot cloud, is occurring in a dynamic condition within the recess of the piston, the use of a single orifice under some conditions could result in less than optimum reduction of smoke and particulate emissions discharged in the exhaust stream of the engine, unless it was possible to calculate the ideal location of such a single orifice.

Figure 7:
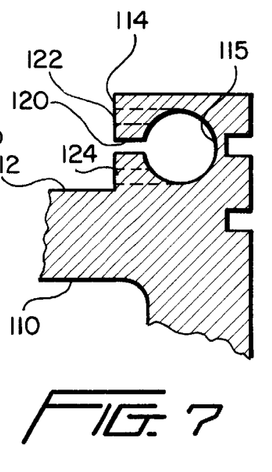
FIG. 7 is a view taken along section line VII—VII of FIG. 6b.

In accordance with the present invention, optimization of interaction with each soot cloud is achieved by providing two intersecting rows of discrete orifices as illustrated in FIGS. 6a, 6b and 7 with the circumferentially extending row 116, 118 and 120 aligned so as to discharge radicals from the reaction chamber 115 towards and in alignment with the predicted or expected central area of the soot cloud in the recess and further with the inclined or diagonal row of orifices 122, 118 and 124 positioned so that they discharge slightly above, directly into and slightly below the predicted central area of the soot cloud, with the row of orifices 122, 118 and 124 located and aligned diagonally between the end orifices 116, 120. Moreover, relative to the swirl direction F, the diagonal arrangement of orifices 122, 118 and 124 is such that the upper orifice 122 is located upstream of orifice 124 relative to the swirl direction F. That is, swirling gaseous components in the combustion chamber will intersect orifice 122 before they will intersect orifices 118 and 124. This arrangement has been observed to produce a substantial reduction in smoke and particulate emissions from the exhaust stream of direct injected diesel engines due to a highly effective interchange between the radical species discharged from the reaction chamber 115 and the soot cloud formed in the piston recess.

It is theorized that this highly effective solution results from the interaction of the radical species discharged from the reaction chamber in a flow pattern that cooperates with the swirling air and fuel mixture and the swirling soot cloud in the recess. It is believed that the soot cloud may not exist in a stable pattern, but rather changes form rapidly as it is caught up in the swirling air and fuel mixture so that the central area of the soot cloud may occur at slightly different locations upon each ignition of the air/fuel mixture and may then change positions slightly as combustion proceeds. Also, the piston 110 itself is approaching the top dead center position and then moves downwardly from the top dead center position as combustion is initiated and proceeds towards the expansion portion of the combustion cycle. This dynamic condition is believed to require an array of orifices arranged in accordance with the present invention to ensure maximum interaction between the radicals, the soot cloud formed in the combustion chamber and the total charge of air and fuel swirling within the recess as combustion proceeds.

It will thus be observed that the configuration of the orifice array in accordance with the present invention achieves non-symmetric or chaotic flow patterns within the reaction chamber 115, maximum interaction between the air and fuel admitted into the reaction chamber and the reaction chamber sidewalls (heated, of course, from previous and current combustion cycles), and discharge of radicals in a pattern that maximizes interaction with the soot cloud formed in the piston recess and the swirling gas and air mixture at various stages of the combustion cycle.

Notably, the Design Index "I" in accordance with the present invention can be stated as:

$I$=1 to 10.

While a specific arrangement of intersecting orifice rows has been described herein, it will be understood that the inventive concept permits the adjustment of the positions and angularity of the rows or orifices to meet different conditions existing in different combustion chambers. Thus, while the angularity of the diagonal row of orifices may be inclined in one direction in accordance with one embodiment of the invention, the diagonal row of orifices 118, 122b, 124b also could be inclined in the opposite direction as shown in FIG. 6d to take into account different operating conditions, for example, a different swirl pattern, in a different engine. Also, it may be desired to induce a different flow pattern within the reaction chamber by varying the tangential location of the end orifices 122, 124 of the diagonal row. A symmetrical flow pattern within the reaction chamber 115 is not considered to be desirable; a chaotic flow pattern, on the other hand, is believed to maximize the reaction between fuel and oxygen in the reaction chamber to produce radicals, including intermediate species that will become available for interaction with the succeeding combustion cycle.

The invention contemplates the possibility of introducing additional rows or orifices to meet various flow conditions in the combustion chamber or to induce chaotic conditions within the reaction chamber 115. While only two rows of orifices have been described herein, it is to be understood that additional rows can be utilized to achieve the design objectives described above.

In addition, this invention contemplates the possibility of aligning the second row of orifices vertically with the central common orifice 118, as shown in FIG. 6c. In this instance, orifices 122a and 124a are located vertically above and below, respectively, central orifice 118.

While the first and second rows of orifices described above intersect at a common orifice 118 in accordance with a preferred embodiment of the invention, it is to be understood that the second row of orifices, whether extending in a diagonal or perpendicular direction relative to the longitudinal axis of the reaction chamber, could be located so that it does not share a common orifice with the first row extending generally centrally along the reaction chamber.

Obvious variations of the structural arrangement depicted in the preferred embodiments of the invention can be made without departure from the spirit and scope of the invention as defined in the claims that follow.

What is claimed is:

1. In a piston for a reciprocating piston internal combustion engine in which a combustion cycle is carried out in a variable volume combustion chamber defined by the piston reciprocating in a close ended cylinder into which a combustible mixture of fuel and air is periodically supplied, and which cycle includes intake, compression, combustion, expansion and exhaust portions, and wherein the piston crown includes a recess that contains the majority of the fuel and air mixture when the combustion chamber is at minimum volume and further wherein the fuel and air are caused to swirl in a swirl direction within the recess;

said piston including at least one reaction chamber having a curvilinear cross-section extending circumferentially in the piston crown area adjacent the periphery of the recess, and an array of discrete orifices including at least one fuel control orifice and at least one air control orifice, said array of discrete orifices providing the sole communication between the recess and the reaction chamber, said at least one fuel control orifice being located so as to receive and control admission of primarily fuel of said mixture to the reaction chamber during each intake and compression portion of each combustion cycle and said at least one air control orifice being arranged to receive and control admission of primarily air of said mixture to the reaction chamber during each intake and compression portion of each combustion cycle, said respective fuel and air control orifices intersecting the reaction chamber at separate locations;

said reaction chamber and orifices being shaped and dimensioned such that during the compression portion of each combustion cycle, a portion of the fuel and air mixture is admitted into the reaction chamber through the orifices in a manner such that the mixture admitted to the reaction chamber is at least partly vortically swirled in intimate contact with the sidewalls of the reaction chamber so as to effect heat transfer to the admitted mixture and its partial oxidation reaction to create radical species of the fuel and any flame front approaching the reaction chamber from the combustion chamber is quenched so that radicals of the fuel are produced and retained temporarily in the reaction chamber during the combustion, expansion and exhaust portions of the combustion cycle and are discharged into the piston recess following the conclusion of said exhaust portion in advance of the compression portion of the succeeding combustion cycle in sufficient quantity to condition the succeeding charge in the combustion chamber for preselected ignition and combustion characteristics; and a fuel directing system arranged to direct a portion of fuel of the mixture towards the fuel control orifice;

the improvement comprising:

said array of orifices being arranged so that, along the circumferential direction of the reaction chamber, flow of air and fuel into the chamber through the orifices creates non-symmetric chaotic circulatory flow patterns in the reaction chamber;

said array of orifices comprising at least a first row of aligned orifices extending along the central cross-sectional area of the reaction chamber and at least a second row of aligned orifices extending diagonally along the reaction chamber length, said at least first and second orifice rows intersecting each other;

at least the endmost orifices of said second row being located for tangential communication with the curvilinear cross-section of the reaction chamber.

2. The improvement as claimed in claim 1, wherein said at least first and second orifice rows intersect each other at approximately the mid-point of the reaction chamber length.

3. The improvement as claimed in claim 2, wherein cyclic combustion of fuel and air in the combustion chamber results in formation of a soot cloud including a central portion in the recess each combustion cycle;

said at least first orifice row being arranged to discharge outflow from the reaction chamber in alignment with the central area of the soot cloud each combustion portion of each combustion cycle.

4. The improvement as claimed in claim 1, wherein a swirl flow of charge and combustion gases in a given direction is induced in the combustion chamber each combustion cycle and wherein an uppermost orifice of said second row is located upstream relative to the direction of said swirl flow and relative to the lowermost orifice of said second row.

5. In a piston for a reciprocating piston internal combustion engine in which a combustion cycle is carried out in a variable volume combustion chamber defined by the piston reciprocating in a close ended cylinder into which a combustible mixture of fuel and air is periodically supplied, and which cycle includes intake, compression, combustion, expansion and exhaust portions, and wherein the piston crown includes a recess that contains the majority of the fuel and air mixture when the combustion chamber is at minimum volume and further wherein the fuel and air are caused to swirl in a swirl direction within the recess;

said piston including at least one reaction chamber having a curvilinear cross-section extending circumferentially in the piston crown area adjacent the periphery of the recess, and an array of discrete orifices including at least one fuel control orifice and at least one air control orifice, said array of discrete orifices providing the sole communication between the recess and the reaction chamber, said at least one fuel control orifice being located so as to receive and control admission of primarily fuel of said mixture to the reaction chamber during each intake and compression portion of each combustion cycle and said at least one air control orifice being arranged to receive and control admission of primarily air of said mixture to the reaction chamber during each intake and compression portion of each combustion cycle, said respective fuel and air control orifices intersecting the reaction chamber at separate locations;

said reaction chamber and orifices being shaped and dimensioned such that during the compression portion of each combustion cycle, a portion of the fuel and air mixture is admitted into the reaction chamber through the orifices in a manner such that the mixture admitted to the reaction chamber is at least partly vortically swirled in intimate contact with the sidewalls of the reaction chamber so as to effect heat transfer to the admitted mixture and its partial oxidation reaction to create radical species of the fuel and any flame front approaching the reaction chamber from the combustion chamber is quenched so that radicals of the fuel are produced and retained temporarily in the reaction chamber during the combustion, expansion and exhaust portions of the combustion cycle and are discharged into the piston recess following the conclusion of said exhaust portion in advance of the compression portion of the succeeding combustion cycle in sufficient quantity to condition the succeeding charge in the combustion chamber for preselected ignition and combustion characteristics; and a fuel directing system arranged to direct a portion of fuel of the mixture towards the fuel control orifice;

the improvement comprising:

said array of orifices comprising at least a first row of aligned, orifices extending along the central cross-sectional area of the reaction chamber and at least a second row of aligned orifices extending diagonally along the reaction chamber cross-sectional area, said at least first and second orifice rows intersecting each other;

at least the endmost orifices of said second row being located for tangential communication with the curvilinear cross-section of the reaction chamber.

6. The improvement as claimed in claim 5, wherein said at least first and second orifice rows intersect each other at approximately the mid-point of the reaction chamber length.

7. The improvement as claimed in claim 5, wherein cyclic combustion of fuel and air in the combustion chamber results in formation of a soot cloud including a central portion in the recess each combustion cycle;

said at least first orifice row being arranged to discharge outflow from the reaction chamber in alignment with the central area of the soot cloud each combustion portion of each combustion cycle.

8. The improvement as claimed in claim 5, wherein said soot cloud swirls circumferentially within the recess, and wherein said second orifice row is located so as to discharge the outflow of said second row from the reaction chamber so that the outflow intersects the swirling soot cloud.

9. The improvement as claimed in claim 8, wherein an uppermost orifice of said second row is located upstream relative to the direction of swirling motion of said soot cloud and relative to the lowermost orifice of said second row.

10. In a process of radical seeding of a mixture of air and fuel in a combustion chamber of an air breathing reciprocating piston type internal combustion engine including a piston having a recess area at its crown area, said recess defined by recess bottom and one or more side walls, said recess defining the major part of the combustion chamber volume at the combustion chamber minimum volume condition, and a fuel supply system arranged to cyclically supply a fuel and air mixture into the combustion chamber to carry out combustion cycles including intake, compression, combustion, expansion and exhaust portions, and that includes the steps of:

providing a reaction chamber having a curvilinear cross section extending circumferentially along the piston crown area adjacent a recess side wall and extending at least part way around the outer periphery of the recess area;

providing an array of discrete orifices in the piston crown along a recess side wall that provides the sole communication between the reaction chamber and the recess area;

selecting orifice dimensions, configuration and location such that combustion flames from the combustion chamber are quenched by the orifices before they can extend into the reaction chamber and such that inflow and outflow of compressible gases to and from the reaction chamber from and to the recess area and such that radicals generated in the reaction chamber during a combustion cycle are partially retained in the reaction chamber during the combustion, expansion and exhaust portions of the combustion cycle and are partially discharged into the recess area near the start of the compression portion of the succeeding combustion cycle;

carrying out each combustion cycle by directing at least a portion of the mixture into the reaction chamber and partially cool flame oxidizing the fuel of the mixture in the reaction chamber to generate radical fuel species while the charge is vortically swirled in intimate contact with the chamber sidewalls, and by discharging a portion of the radicals generated in the reaction chamber into the recess through said orifice array under said choked outflow conditions;

carrying out the generation of radicals in the reaction chamber and controlling the generation of radicals within the reaction chamber in accordance with the formula:

$$R_{OUT} = R_{GEN.} + R_{IN} - R_{RET.} \geq R_{CRIT.}$$

where:

$R_{OUT}$=radicals discharged from the reaction chamber into the piston recess area;

$R_{GEN.}$=radicals generated during each combustion cycle in the reaction chamber;

$R_{IN}$=seeded radicals returned to the reaction chamber from the combustion chamber during compression of a charge;

$R_{RET.}$=radicals retained in the reaction chamber;

$R_{CRIT}$=the minimum quantity of radical species of fuel in the reaction chamber required to obtain preselected ignition and combustion characteristics of the charge each combustion cycle;

causing the mixture in the recess to swirl circumferentially during each intake, compression and initial combustion portions of each combustion cycle with generation of a co-swirling soot cloud having a central area during the initial combustion portion of each combustion cycle;

the improvement comprising:

arranging the array of discrete orifices so that it includes at least a first row of aligned orifices extending along the central cross-sectional area of the reaction chamber and at least a second row of aligned orifices extending diagonally along the reaction chamber length, with said at least first and second aperture rows intersecting each other;

locating at least the endmost orifices of said at least second row so they are in tangential communication with the curvilinear cross-section of the reaction chamber and locating the at least first and second orifice rows so that the rows intersect each other at approximately the mid-point of the reaction chamber length; and directing the outflow from the at least first orifice row so the outflow is aligned with the central area of the soot cloud while the soot cloud swirls in the recess past the at least first row of orifices, and directing the outflow from the at least second orifice row so that it intersects the swirling soot cloud passing the first orifice row.

11. The improvement as claimed in claim 10, including inducing a swirling flow of charge and combustion gases in a given direction in the combustion chamber each combustion cycle and locating an uppermost orifice of said at least second row upstream relative to the direction of said swirl flow and relative to the lowermost orifice of said second row.

12. In a piston for a reciprocating piston internal combustion engine in which a combustion cycle is carried out in a variable volume combustion chamber defined by the piston reciprocating in a close ended cylinder into which a combustible mixture of fuel and air is periodically supplied, and which cycle includes intake, compression, combustion, expansion and exhaust portions, and wherein the piston crown includes a recess that contains the majority of the fuel and air mixture when the combustion chamber is at minimum volume and further wherein the fuel and air are caused to swirl in a swirl direction within the recess;

said piston including at least one reaction chamber having a curvilinear cross-section extending circumferentially in the piston crown area adjacent the periphery of the recess, and an array of discrete orifices including at least one fuel control orifice and at least one air control orifice, said array of discrete orifices providing the sole communication between the recess and the reaction chamber, said at least one fuel control orifice being located so as to receive and control admission of primarily fuel of said mixture to the reaction chamber during each intake and compression portion of each combustion cycle and said at least one air control orifice being arranged to receive and control admission of primarily air of said mixture to the reaction chamber during each intake and compression portion of each combustion cycle, said respective fuel and air control orifices intersecting the reaction chamber at separate locations;

said reaction chamber and orifices being shaped and dimensioned such that during the compression portion of each combustion cycle, a portion of the fuel and air mixture is admitted into the reaction chamber through the orifices in a manner such that the mixture admitted to the reaction chamber is at least partly vortically swirled in intimate contact with the sidewalls of the reaction chamber so as to effect heat transfer to the admitted mixture and its partial oxidation reaction to create radical species of the fuel and any flame front approaching the reaction chamber from the combustion chamber is quenched so that radicals of the fuel are produced and retained temporarily in the reaction chamber during the combustion, expansion and exhaust portions of the combustion cycle and are discharged into the piston recess following the conclusion of said exhaust portion in advance of the compression portion of the succeeding combustion cycle in sufficient quantity to condition the succeeding charge in the combustion chamber for preselected ignition and combustion characteristics; and a fuel directing system arranged to direct a portion of fuel of the mixture towards the fuel control orifice;

the improvement comprising:

said array of orifices being arranged so that, along the circumferential direction of the reaction chamber, flow of air and fuel into the chamber through the orifices creates non-symmetric chaotic circulatory flow patterns in the reaction chamber;

said array of orifices comprising at least a first row of aligned orifices extending along the central cross-sectional area of the reaction chamber and at least a second row of aligned orifices, said at least first and second orifice rows intersecting each other and wherein one of the orifices is common to both said rows;

at least the endmost orifices of said second row being located for tangential communication with the curvilinear cross-section of the reaction chamber.

13. The improvement as claimed in claim 12, wherein said second row is diagonally inclined relative to said first row.

14. The improvement as claimed in claim 12, wherein said second row is perpendicular to said first row.

15. The improvement as claimed in claim 13 or 14, wherein said at least first and second orifice rows intersect each other at approximately the mid-point of the reaction chamber length.

16. The improvement as claimed in claim 13 or 14, wherein cyclic combustion of fuel and air in the combustion chamber results in formation of a soot cloud including a central portion in the recess each combustion cycle;

said at least first orifice row being arranged to discharge outflow from the reaction chamber in alignment with the central area of the soot cloud each combustion portion of each combustion cycle.

17. The improvement as claimed in claim 13 or 14, wherein a swirl flow of charge and combustion gases in a given direction is induced in the combustion chamber each combustion cycle and wherein an uppermost orifice of said second row is located upstream relative to the direction of said swirl flow and relative to the lowermost orifice of said second row.

18. In a piston for a reciprocating piston internal combustion engine in which a combustion cycle is carried out in a variable volume combustion chamber defined by the piston reciprocating in a close ended cylinder into which a combustible mixture of fuel and air is periodically supplied, and which cycle includes intake, compression, combustion, expansion and exhaust portions, and wherein the piston crown includes a recess that contains the majority of the fuel and air mixture when the combustion chamber is at minimum volume and further wherein the fuel and air are caused to swirl in a swirl direction within the recess;

said piston including at least one reaction chamber having a curvilinear cross-section extending circumferentially in the piston crown area adjacent the periphery of the recess, and an array of discrete orifices including at least one fuel control orifice and at least one air control orifice, said array of discrete orifices providing the sole communication between the recess and the reaction chamber, said at least one fuel control orifice being located so as to receive and control admission of primarily fuel of said mixture to the reaction chamber during each intake and compression portion of each combustion cycle and said at least one air control orifice being arranged to receive and control admission of primarily air of said mixture to the reaction chamber during each intake and compression portion of each combustion cycle, said respective fuel and air control orifices intersecting the reaction chamber at separate locations;

said reaction chamber and orifices being shaped and dimensioned such that during the compression portion of each combustion cycle, a portion of the fuel and air mixture is admitted into the reaction chamber through the orifices in a manner such that the mixture admitted to the reaction chamber is at least partly vortically swirled in intimate contact with the sidewalls of the reaction chamber so as to effect heat transfer to the admitted mixture and its partial oxidation reaction to create radical species of the fuel and any flame front approaching the reaction chamber from the combustion chamber is quenched so that radicals of the fuel are produced and retained temporarily in the reaction chamber during the combustion, expansion and exhaust portions of the combustion cycle and are discharged into the piston recess following the conclusion of said exhaust portion in advance of the compression portion of the succeeding combustion cycle in sufficient quantity to condition the succeeding charge in the combustion chamber for preselected ignition and combustion characteristics; and a fuel directing system arranged to direct a portion of fuel of the mixture towards the fuel control orifice;

the improvement comprising:

said array of orifices being arranged so that, along the circumferential direction of the reaction chamber, flow of air and fuel into the chamber through the orifices creates non-symmetric chaotic circulatory flow patterns in the reaction chamber;

said array of orifices comprising at least a first row of aligned orifices extending along the central cross-sectional area of the reaction chamber and at least a second row of aligned orifices extending vertically to the first row, said at least first and second orifice rows intersecting each other;

at least the endmost orifices of said second row being located for tangential communication with the curvilinear cross-section of the reaction chamber.

19. The improvement as claimed in claim 18, wherein said at least first and second orifice rows intersect each other at approximately the mid-point of the reaction chamber length.

20. The improvement as claimed in claim 18, wherein cyclic combustion of fuel and air in the combustion chamber results in formation of a soot cloud including a central portion in the recess each combustion cycle;

said at least first orifice row being arranged to discharge outflow from the reaction chamber in alignment with the central area of the soot in cloud each combustion portion of each combustion cycle.

21. The improvement as claimed in claim 18, wherein a swirl flow of charge and combustion gases in a given direction is induced in the combustion chamber each combustion cycle and wherein an uppermost orifice of said second row is located upstream relative to the direction of said swirl flow and relative to the lowermost orifice of said second row.

* * * * *